United States Patent Office 2,798,044
Patented July 2, 1957

2,798,044

ANTISTATIC COMPOSITION, TREATMENT OF SHAPED ARTICLES THEREWITH, AND TREATED ARTICLES

Emil Alfred Vitalis, Springdale, Conn., assignor to American Cyanamid Company, New York, N. Y., a corporation of Maine No Drawing. Application February 25, 1953, Serial No. 338,902

15 Claims. (Cl. 252—8.7)

This invention relates to a new and useful antistatic composition, to the treatment of shaped articles, more particularly such articles comprising one or more vinyl resins, with the new antistatic composition and to the treated articles.

The antistatic composition with which the present invention is concerned comprises (1) an antistatic agent which is a salt, more particularly an inorganic salt, e. g., magnesium chloride, nitrate and chromate, magnesium acid phosphate, sodium nitrite and nitrate, strontium chloride and nitrate, zinc chloride, calcium chloride, etc., and (2) a particular bis-ester of sulfosuccinic acid, the ingredients of (1) and (2) being present in the said antistatic composition in weight percentages of from about 5% to about 97% of the former to from about 95% to about 3% of the latter.

The bis-ester of sulfosuccinic acid that is an essential component of the antistatic compositions herein involved is more fully described (including method of preparation) and is broadly and specifically claimed in the copending application of Jack T. Thurston, Serial No. 338,917, filed concurrently herewith, now Patent No. 2,734,833 dated February 14, 1956. They are bis-esters of sulfosuccinic acid with a substantially bimolecular quantity of a higher fatty acid glyceride derived from a member of the group consisting of animal and vegetable oils and fats containing less than 15% by weight of polyunsaturated fatty acids. Examples of such fatty acid glycerides are tallow fatty acid glyceride, stearic acid monoglyceride, etc. The higher fatty acid glyceride may be one which comprises a mixture of from about 50% to about 95% monoglyceride and from about 50% to about 5% diglyceride, these percentages being on a molar basis.

The antistatic compositions briefly described above are employed in conditioning a material or article which, in a dry state, normally tends to accumulate static charges of electricity thereon whereby this tendency is minimized or obviated. Such articles include certain textile materials in fiber, fabric or other form, certain sheet materials, e. g., those used in making photographic films, etc. To impart antistatic characteristics thereto, a liquid-treating or antistatic composition (specifically an aqueous solution or dispersion) comprising the antistatic agent of (1) and the bis-ester of (2) that are set forth in the second paragraph of this specification is applied to, or incorporated in or with, the base material. The antistatic agent of (1) is usually a soluble (specifically water-soluble) inorganic salt that normally is deposited in the form of relatively large crystals upon volatilization of the solvent in which it is dissolved, examples of which have been given hereinbefore. The bis-ester of (2) has a plurality of functions, one of which is to inhibit the deposition of the aforesaid crystals; and, therefore, is present in the antistatic composition in an amount, with respect to the inorganic antistatic agent, that will effect this result. The amount of the aforesaid liquid-treating or antistatic composition that is applied to the base material or article is such that the total amount of the inorganic antistatic agent of (1) and the bis-ester of (2) held by the treated article is from about 0.2% to about 10% of the weight of the dried, untreated material. The aforesaid ingredients of (1) and (2) are dissolved or dispersed ("dispersed" being used generically hereinafter and in the appended claims to cover both solutions and dispersions) in a volatile liquid, e. g., water. The treated material or article is then dried to volatilize the aforesaid liquid.

It was suggested prior to my invention that antistatic compositions comprising an inorganic salt be used for treating textile materials that readily acquire and retain an electrostatic charge in order to impart antistatic characteristics thereto. For example, in Dreyfus Patent No. 2,086,544 it is suggested that various hygroscopic or deliquescent solids, more particularly electrolytes such as various organic and inorganic salts (among which the chlorides and nitrates of magnesium, calcium and zinc specifically are mentioned), be dissolved in an alcoholic medium e. g., methyl or ethyl alcohol or mixtures of water and an alcohol, and that the resulting solution be applied to staple fibers composed of or containing cellulose ester or ether filaments in order that the staple might be spun into yarn without difficulty due to the accumulation of electrostatic charges. It is further disclosed in this Dreyfus patent that the alcoholic solution of the electrolyte also may contain a lubricant, e. g., a fatty oil or a light or heavy mineral oil; and that, in conjunction with the application of the alcoholic solution, there also may be applied to the staple a softener or swelling agent which functions to increase the flexibility of the filaments, e. g., triacetin, the monomethyl and monoethyl ethers of ethylene glycol and the diethyl ether of diethylene glycol.

In Whitehead Patent No. 2,086,590 it is suggested that electrolytes, such as those disclosed in the aforementioned Dreyfus patent, be dissolved in a solvent of relatively high boiling point, e. g., ethylene glycol, diethylene glycol, glycerol and diacetone alcohol, and that the resulting solution be applied to, or incorporated in, staple fibers made of organic derivatives of cellulose, such as organic esters of cellulose and cellulose ethers, in order to reduce the tendency of such fibers to generate static electricity during the spinning operation. Also, in my Patents 2,562,154, -5, -6 and 2,567,159 I have disclosed and claimed wetting and detergent compositions containing a higher monoalkyl sulfosuccinate and various water-soluble inorganic salts, among which magnesium nitrate and chloride specifically are mentioned, as a solubilizing agent for the aforementioned sulfosuccinate.

In my copending application Serial No. 308,915, filed September 10, 1952, now Patent No. 2,717,842 dated September 13, 1955, I have disclosed and broadly claimed a method of conditioning a material or article that, in a dry state, normally tends to accumulate static charges of electricity thereon, which method involves treating such a material with a liquid-treating composition comprising (1) an antistatic agent which is a soluble inorganic salt that normally is deposited in the form of relatively large crystals upon volatilization of the solvent in which it is dissolved and (2) a crystal growth-inhibiting agent; and, also, the thusly conditioned material or article. The bis-esters of sulfosuccinic acid that are an essential component of the antistatic compositions with which the present invention is concerned were not disclosed in the aforesaid copending application Serial No. 308,915.

The present invention is based on my discovery that antistatic compositions of the kind described briefly in the second paragraph of this specification and more fully elsewhere herein possess an unobvious combination of properties, which combination renders them eminently suitable for the treatment of a wide variety of organic materials or articles, examples of which are organic textile materials, e. g., in the form of continuous-filament yarn, staple fiber, tow, roving, knitted, woven or felted fabrics, and which may be composed of or contain fibers or filaments of wool, silk, cellulose esters (e. g., cellulose acetate, cellulose acetobutyrate, cellulose formate, cellulose propionate, cellulose butyrate, etc.), cellulose ethers (e. g., ethyl cellulose, benzyl cellulose, etc.), viscose rayons, nylon, thermoplastic vinyl resins (e. g., vinyl chloride polymers and copolymers, acrylonitrile polymers and copolymers, etc.), and other natural and synthetic organic textiles in fiber, fabric or other form. For example, they have both a softening and lubricating action on the textile and, in addition, have the ability to retard or obviate the accumulation of static charges of electricity on such textiles which normally tend to become charged with static electricity. This is a matter of considerable practical importance since both continuous-filament yarn and staple fibers are subjected to processes wherein softness and/or good lubricity are prime requisites. Furthermore, in many processes the fibers, by reason of their constitution, develop and retain static charges of electricity that interfere with the processing operations.

The aforementioned and other difficulties are obviated by the use of the antistatic compositions herein involved and which provide static control with good static durability under low-humidity conditions or even in the complete absence of moisture. They also provide good static control at elevated temperatures. Furthermore, despite the fact that they contain a salt, more particularly a water-soluble inorganic salt (including those which normally form relatively large, sharp crystals upon volatilization of the solvent in which they are dissolved), the compositions appear to have no deleterious effect on textile equipment nor do they abrade, tear or shred the fiber during carding, drawing or other processing operations. Additionally, they can be applied to freshly spun fibers or filaments, including those which have been produced by a wet-spinning process and are still in a gel state (e. g., an aquagel or hydrogel state), without any apparent deleterious effect upon the structure of the fiber. These results were quite surprising and unexpected and in no way could have been predicted from the known properties of the components of the antistatic composition.

In the antistatic compositions of the present invention the crystal growth-inhibiting component thereof coacts, at least during use of the composition, with antistatic inorganic salt component thereof so as to modify, as to size, shape or hardness, any crystal or crystals of the said inorganic salt that normally might tend to form or be deposited upon volatilization of the solvent in which the salt is dissolved; or, in some cases, so as to prevent crystal formation or deposition completely. The latter represents the optimum condition to be attained and is generally secured when the preferred inorganic salts (examples of which have been given in the second paragraph and others of which will be given hereinafter) are employed in the optimum weight ratios with the crystal growth-inhibiting bis-ester. Under less favorable conditions, the normal tendency of the antistatic inorganic salt to form relatively large crystals, and which also may be relatively hard and/or sharp, or abrasive, can be modified or controlled so that crystals having a maximum average particle size of about 5 microns are present in the composition. Such sizes are near the lower limit of the resolving power of light microscopes. Such small crystals are relatively soft (substantially non-abrasive) and appear to have no harmful effect upon textile equipment or upon the fiber that is being processed.

The crystal growth-inhibiting agent that is a component of the antistatic compositions herein involved is a particular bis-ester of sulfosuccinic acid, more particularly a bis-ester of the kind disclosed and broadly and specifically claimed in the aforementioned Thurston copending application Serial No. 338,917 and which include sulfosuccinic bis-esters represented by the following general formulas:

I

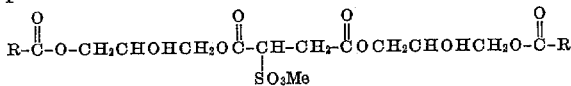

and

II

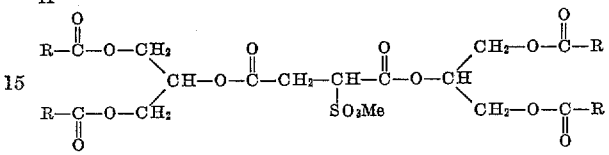

In the above formulas R represents a higher fatty acid radical, preferably one having from 12 to 18 carbon atoms, inclusive, and which is derivable from animal and/or vegetable oils and fats containing less than 15% by weight of polyunsaturated fatty acids; and Me represents a salt-forming cation, preferably such a cation of the group consisting of alkali metals and ammonium. The salt-forming cation represented by Me in the above formula may be any of the alkali metals, ammonium, polyvalent metals (e. g., barium, strontium, calcium, magnesium, etc.) or those derived from organic bases such, for instance, as methyl, ethyl, propyl and butyl amines, dimethyl, diethyl, dipropyl and dibutyl amines, mono-, di- and triethanol amines, as well as other higher aliphatic and hydroxy-aliphatic amines, guanylurea, guanidine, hydroxyethylguanidine, biguanide, aryl amines, e, g., aniline, etc., aralkyl amines, e. g., benzyl amine, etc., alkaryl amines, e. g., toluidine, etc., and heterocyclic bases, e. g., nicotine, pyridine, quinoline, alkaloids, etc.

The following animal and vegetable oils and fats are set forth as illustrative but not limitative of the type of oil or fat used as a source of the higher fatty acid glycerides: the vegetable oils, e. g., coconut oil, palm kernel oil, ouricury oil, ocuhuba oil, tea seed oil, olive oil, and palm oil; and such animal oils and fats as, for example, lard, Chinese tallow, mutton tallow and beef tallow, neat's-foot oil, etc. It is particularly to be noted that these oleaginous materials do not possess any substantial amount of hydroxy acids; that they contain less than about 15% by weight of polyunsaturated fatty acids; that they have relatively low iodine values (the quantity of iodine in mg. absorbed by 1 gram of oil under normal conditions); and that they basically possess a non-drying nature.

Hydrogenated oils which do not contain any interfering hydroxy groups (such as those in, for example, castor oil) may be used, provided the unsaturation of the fatty acids therein is reduced to below the above-mentioned 15% value and to correspondingly low iodine values. Such oils include, for example: hydrogenated cottonseed oil, hydrogenated corn oil, hydrogenated peanut oil, hydrogenated soya bean oil, hydrogenated sunflower seed oil, hydrogenated sesame oil, hydrogenated kapok oil, hydrogenated rapeseed oil, hydrogenated tung oil, etc.

Although the oils and fats used as a source of higher fatty acid glycerides contain fatty acids having various chain lengths, particularly useful bis-esters are produced from glycerides containing a substantial amount of fatty acids having a chain length of from 12 to 18 carbon atoms, inclusive, with those having a chain length of from 16 to 18 carbon atoms, inclusive, being preferred. It will be understood, of course, by those skilled in the art that selected fatty acids, e. g., stearic acid, lying in the preferred range of carbon chain length, and possessing the properties and characteristics noted above, may also be used.

It is not essential that the sulfosuccinic acid bis-ester be the reaction product resulting from the use of 100% pure monoglycerides. A mixture of monoglycerides and diglycerides is normally commercially present, and it has been found that a molar ratio of these two consitituents within the range of from about 50% to about 95% monoglyceride and from about 50% to about 5% is diglyceride is well adapted for use in producing the bis-ester. The presence of diglycerides in greater proportion than about 50%, however, undesirably decreases the water-solubility characteristics of the bis-ester and, therefore, advantageously is avoided.

Briefly, the sulfosuccinic bis-esters employed in the antistatic compositions of the present invention are prepared by means of a three-step process. The monoglyceride (or mixture of mono- and diglycerides) is prepared by reacting the selected animal or vegetable oil or fat with an excess of glycerol in the presence of a basic material, for instance an alkali, alkaline-earth or heavy-metal oxide or hydroxide, e. g., sodium hydroxide, calcium hydroxide, lead oxide, etc. After the reaction to form the monoglyceride is complete, the basic catalyst is removed by precipitation as a fumarate salt.

In order to prevent the formation of an insoluble resin, which is believed to be a cross-linked glycerol-maleic or -fumaric ester, it is necessary to heat-treat the monoglyceride in the presence of at least 10 mole percent of added fatty acid, e. g., stearic, palmitic or oleic acid, or the equivalent thereof. A time of at least 1 hour and a temperature of about 100°–150° C. is desirable for this heat treatment.

The resulting heat-treated monoglyceride is then condensed with approximately one-half of an equimolar amount of maleic anhydride, fumaric acid or maleic acid to obtain the corresponding fumarate (maleate) bis-ester. This condensation product is then sulfonated by use of a bisulfite or meta-bisulfite (or mixture thereof) containing a cationic salt-forming substituent, advantageously any of the alkali metals or ammonium. Preferably the sulfonation is carried out by heating the aforementioned condensation product with an aqueous solution of alkali-metal or ammonium bisulfite whereby the corresponding salt is obtained directly.

The bis-esters used in producing the antistatic compositions of this invention are preferably those which are readily soluble or dispersible in water. They can be economically produced from commercially available raw materials, and can be easily prepared in a wide range of commercially useful forms and with solubility and other characteristics which will best meet the special requirements of an antistatic composition for a particular service application.

The antistatic compositions used in practicing the present invention are produced by mixing together, in any suitable manner, ingredients of the kind described briefly in the second paragraph of this specification and more fully elsewhere herein. For example, a composition containing 25% by weight of solids and which is dilutable with water to 0.2 to 20% by weight of solids for use as herein described can be prepared as follows:

| | Parts |
|---|---|
| Crystal growth-inhibiting agent, more particularly a bis-ester of the kind disclosed and claimed in the aforementioned Thurston copending application Serial No. 338,917 | 106.9 |
| Antistatic inorganic salt, e. .g, $Mg(NO_3)_2 \cdot 6H_2O$ | 288.1 |
| Water | 605.0 |
| Total | 1000.0 |

The water (advantageously water that has been subjected to an ion-exchange treatment) is introduced into a suitable reaction vessel and heated therein, for instance to a temperature of 155°–165° F. The bis-ester (crystal growth-inhibiting agent) is then added, and the mixture is stirred until the aforesaid ingredient has been substantially completely dissolved or uniformly dispersed, e. g., for from ½ to 3 hours or longer. If desired or required, one may then add a suitable anti-foam agent, e. g., from about 0.00005 to 0.001 part of silicone oil (antifoaming type, e. g., Dow-Corning "Antifoam A") dissolved in a suitable solvent, for instance a mixture of benzene and isopropanol in a 70–30 volume ratio. The antistatic inorganic salt, e. g., $Mg(NO_3)_2 \cdot 6H_2O$, sodium nitrate, etc., is then added slowly while agitating the mixture, for instance over a period of from ½ to 1 or 2 hours. The pH may then be, for example, from about 2.8 to about 3.2, or lower or higher, depending upon the particular ingredients employed. The pH is then preferably adjusted to about 5.4 to 5.8, if lower than about 5.4, by adding a suitable basic material, e. g., morpholine, in an amount sufficient to bring the mass within this pH range. The resulting product is then mixed with water to provide an antistatic composition of the desired solids content.

For convenience and economy in handling and shipping, the antistatic substances used in practicing the present invention may be prepared in the form of pastes or paste-like materials which are dilutable with water to form substantially homogeneous antistatic compositions and which comprise the ingredients described in the second paragraph, that is, an antistatic inorganic salt (1) and a particular bis-ester as a crystal growth-inhibiting agent (2). The solid ingredients of (1) and (2) usually are present in the antistatic composition in weight percentages of from about 5 to 97% of the former to from about 95 to 3% of the latter. The aforementioned ingredients of (1) and (2) and water are preferably present in such paste-like materials in weight percentages of from about 20% to about 65% of the said ingredients of (1) and (2) to from about 80% to about 35% of water. Typical formulations in the preparation of 25% pastes and 60% pastes are given below by way of illustration and wherein the percentages are by weight:

25% PASTE

| | Minimum, percent | Maximum, percent | Average, percent |
|---|---|---|---|
| Crystal growth-inhibiting agent (bis-ester) | 1.20 | 23.00 | 8.33 |
| Antistatic inorganic salt, e. g., magnesium nitrate, sodium nitrate, etc. | 23.80 | 2.00 | 16.67 |
| Water | 75.00 | 75.00 | 75.00 |
| Total | 100.00 | 100.00 | 100.00 |

60% PASTE

| | Minimum, percent | Maximum, percent | Average, percent |
|---|---|---|---|
| Crystal growth-inhibiting agent (bis-ester) | 2.88 | 55.20 | 20.00 |
| Antistatic inorganic salt, e. g., magnesium nitrate, sodium nitrate, etc. | 57.12 | 4.80 | 40.00 |
| Water | 40.00 | 40.00 | 40.00 |
| Total | 100.00 | 100.00 | 100.00 |

In using the antistatic compositions involved herein, a solution or a dispersion of the composition is applied by any suitable means to the article which, in a dry state, normally has a tendency to accumulate static charges of electricity, followed by drying of the treated article to volatilize the solvent or liquid component. The treatment is applicable to such articles in various forms, for instance in the form of filaments, fibers, yarns, films, woven, knitted and felted fabrics, etc. These antistatic compositions are particularly useful as antistatic finishes for fibers or fabrics composed of or comprising substantial proportions of silk, nylon, wool, viscose rayons, cellulose acetate or other cellulose ester rayons, vinyl resins, including homopolymeric and copolymeric acrylonitrile and other thermoplastic vinyl resins.

As is well known to those skilled in the art, the vinyl resins constitute a class of materials which develop or tend to develop an electrostatic charge upon their surfaces when fibers or other articles made therefrom are subjected to friction during their production and during processing or fabrication of the fibers into fabric or other articles, as well as during the use of the finished article. The antistatic compositions involved have been found to be particularly adapted for use in conditioning filaments, fibers, yarns, films and other shaped articles composed of or containing a vinyl resin so as to obviate or minimize their tendency to accumulate static charges of electricity. Examples of vinyl resins, more particularly thermoplastic vinyl resins, which can have antistatic characteristics imparted thereto by means of the compositions herein described are polyacrylonitrile, copolymers of acrylonitrile and a different vinyl compound such, for instance, as vinyl chloride, copolymers of vinyl acetate and vinyl chloride, etc. Other examples of vinyl resins to which these antistatic compositions advantageously can be applied are given in, for example, Cresswell Patent No. 2,597,708 dated May 20, 1952, e. g., in column 3, lines 41–75, and column 4, lines 1–51. The preferred vinyl resins that are subjected to treatment with the antistatic compositions herein involved are acrylonitrile polymerization products, especially those which contain a substantial amount, more particularly a preponderant proportion, by weight of combined acrylonitrile.

Antistatic compositions used in practicing the present invention may be applied under various pH conditions, as desired or as conditions may require. They may be applied in the cold, warm or at the boil, and are chemically stable to aging. They may be used alone or with other additives or modifiers, e. g., mono-, di- and triethanolamines, lanolin, morpholine, disodium phosphates, dialkyl phosphates, alkyl esters of long-chain fatty acids, e. g., the ethyl to amyl, inclusive, esters of fatty acids containing from 12 to 18 carbon atoms, inclusive, conventional wetting and/or dispersing agents, silicone oils, mineral, vegetable and animal oils, etc. The liquid compositions can be applied advantageously in many cases at a pH of about 6.0 to 7.0, e. g., to articles formed of a polymer of acrylonitrile or other vinyl resin.

The antistatic compositions with the use of which this invention is concerned not only are capable of imparting antistatic characteristics to vinyl resins (including thermoplastic vinyl resins) and other articles which normally, when dry, have a tendency to accumulate electrostatic charges, but in general they are also able to effect this result without detrimentally affecting the color, tensile strength, elasticity, chemical resistance, bacterial and fungal resistance, and other valuable properties of the vinyl resin; in other words, without rendering the vinyl resin article (or other material that is treated) in any way unsuited for its intended purpose. As a matter of fact, and as has been mentioned hereinbefore, the preferred antistatic compositions also beneficially affect the article by imparting softness and lubricity thereto.

The antistatic compositions herein involved are preferably applied to the article to be treated in the form of a liquid dispersion, more particularly an aqueous dispersion. This dispersion may contain any suitable amount of the antistatic composition, but ordinarily the antistatic inorganic salt and crystal growth-inhibiting agent (bis-ester) are present in the dispersion in an amount corresponding to from about 0.2% to about 20% by weight thereof of the aforesaid ingredients. The dispersion may be applied, for example, by immersing the fiber (or other shaped article formed of vinyl resin or other material) in the dispersion, or by spraying, padding, brushing or otherwise contacting the article with the dispersion. The dispersion may be applied at temperatures ranging from room temperature (20°–30° C.) up to the boiling temperature of the dispersion, e. g., about 100° C., as desired or as conditions may require. Upon drying the fiber or other shaped article at room temperature or at an elevated temperature, e. g., on heated drying rolls, in ovens, tunnel driers, etc., the treated article has the solid antistatic composition deposited at least on the outer surfaces thereof. The amount of antistatic composition which is present in or on the dried, treated material or article may vary considerably, but ordinarily it is present therein or thereon in an amount, by weight, corresponding to from about 0.2% to about 10% of the dried, untreated article.

The finishing compositions employed in practicing this invention advantageously may be applied to fibers of polyacrylonitrile and other vinyl resins, as well as to other articles, in percentages by weight, based on total solids applied to the article, as follows:

|  | Minimum, percent | Maximum, percent | Average, percent |
| --- | --- | --- | --- |
| Crystal growth-inhibiting agent (bis-ester) | 0.05 | 5.0 | 0.5 |
| Antistatic inorganic salt | 0.25 | 3.0 | 1.0 |

In general, no particular advantage appears to accrue when the percentage by weight of the antistatic inorganic salt exceeds more than about 3% of the weight of the dry, untreated continuous-filament yarn, staple fiber or other article to which it is applied in order to impart antistatic characteristics thereto. Obviously, the use of higher amounts of the inorganic salt which is applied (in combination with the bis-ester) to the untreated article is not precluded.

The antistatic compositions herein involved may be applied to, for instance, a shaped thermoplastic vinyl resin, for example, yarns of associated filaments of such a resin, in the course of the production of the yarn or other shaped article, or subsequent to the production of the yarn and before or after any textile operations in which such yarns are used, especially those operations which include or involve a winding operation. By applying the antistatic composition in the course of producing the filaments or fibers, the application may suffice for subsequent textile operations. If desired, however, the textile-treating agent comprising the antistatic composition may be applied both during the process of producing the yarns as well as later when these yarns are fabricated into textile fabrics.

The antistatic composition also may be applied to, for instance, thermoplastic vinyl resins or other articles when the latter are in gelled form. For example, I may apply a liquid-treating agent containing the antistatic composition to a fiber in gel state, more particularly an aquagel state, and in which the solid phase comprises, for example, an acrylonitrile polymerization product, more particularly such a product which contains in the molecules thereof an average of at least about 80% by weight of combined acrylonitrile. Thereafter the thusly treated, gelled fiber is dried, for example by continuously passing the fiber over heated drying rolls as is described more fully in, for instance, Cresswell et al. Patent No. 2,558,733, dated July 3, 1951. In this way the applied composition imparts antistatic characteristics to the fiber both during and after drying thereof.

The antistatic compositions herein involved are especially suitable for use in the treatment of water-swollen, oriented or unoriented fibers, films, etc., which have been produced as described in, for example, Cresswell Patents 2,558,730 and 2,558,731, dated July 3, 1951, and in the aforementioned Cresswell et al. Patent No. 2,558,733; also, in the treatment of the dried products, whereby the tendency of the dried material to accumulate static charges of electricity is obviated or minimized and a treated material which, in general, is softer to the touch is obtained.

As has been mentioned hereinbefore, any suitable method may be employed in applying the antistatic composition to the vinyl resin or other base material in fiber, film or other form, and it may be applied at any suitable stage of the production of the shaped article, or during its fabrication into other forms, or to the finished, fabricated article and prior to or during its service use. For example, if the conditioning agent comprising the antistatic composition is to be applied to the yarn after spinning, the yarn may be brought into contact with a wick, roll or felt which has been wetted with a solution or dispersion containing the antistatic agent dissolved or dispersed in water, ethanol (or other alcohol), a water-ethanol mixture, or other liquid solvent or dispersion media. Alternatively, liquid antistatic composition may be applied by immersing the article in a bath containing the same. Examples of points during the production of a yarn at which the antistatic composition may be applied are during stretching of a wet-spun yarn or fiber to orient the molecules thereof, or between any of the guides or godets or other rolls employed in the spinning process, or between the guide and the point of winding and/or twisting; or, the antistatic composition may be applied after winding onto cones, spools, bobbins or the like; or, in the case of staple fiber manufacture either prior to or after cutting the tow into staple lengths.

For example, a tow of filaments that is to be cut into staple fibers may be treated with a dispersion of the antistatic composition prior to cutting. Alternatively, staple fibers such as those which may occur naturally or those cut from continuous lengths of natural or artificial filaments, may be treated with a dispersion of the antistatic composition, e. g., by spraying while the fibers are being moved on a continuous conveyor beneath the spray, followed by drying the treated fibers. Or, the treatment may be applied during an intermediate stage of the spinning operations, e. g., immediately after lapping, carding, drawing or slubbing; or, the antistatic composition may be applied during fiber-mixing or -blending operations. The staple lengths may range, for example, from ½ inch to 8 inches or more and in deniers ranging, for instance, from 1 to 30 deniers or more. The short lengths of dried, treated filaments or threads are then subjected to a suitable spinning operation by any of the conventional systems, e. g., the "cotton," the "worsted," the "wool," the "spun silk," etc.

If desired, the antistatic composition which is deposited in or on the treated article may be allowed to remain in place during and after the production of the article in its ultimate form. The antistatic substance may be removed, as desired or as conditions may require, from yarns, fabrics and the like containing the same by means of the usual aqueous scouring baths. The treated fibers or fabrics can be dyed, if desired, without scouring off the antistatic finish prior to dyeing.

The preferred vinyl resin which is subjected to treatment as herein described is polymeric acrylonitrile or thermoplastic copolymeric acrylonitrile containing in its molecules a substantial amount of combined acrylonitrile. Of such copolymeric acrylonitriles, it is preferred to treat an acrylonitrile copolymer containing in the polymer molecules an average of at least about 80% by weight of combined acrylonitrile, e. g., from about 85% to about 99.5% by weight of combined acrylonitrile. In such copolymeric products, the proportions of monomers in the polymerizable mixture from which the copolymers are made are preferably adjusted so that the final copolymer contains in the molecules thereof an average of at least about 80% by weight of acrylonitrile (combined acrylonitrile). Hence, the expression "acrylonitrile polymerization product containing in the molecules thereof at least about 80% by weight of combined acrylonitrile" means a polymerization product (polymer, copolymer or interpolymer or mixture thereof) containing in its molecules an average of at least about 80% by weight of the acrylonitrile unit, which is considered to be present in the individual polymer molecule as the group

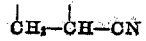

or, otherwise stated, at least about 80% by weight of the reactant substance converted into and forming the polymerization product is acrylonitrile (combined acrylonitrile).

The use of antistatic compositions of the kind with which this invention is concerned in the treatment of, for example, wool, nylon, silk, viscose and acetate rayons, vinyl resins, etc., to obviate or lessen the tendency of such materials to accumulate charges of electricity thereon has numerous advantages, among which may be mentioned their ease of application (e. g., as aqueous dispersions, at any pH, in the cold, or warm, or at the boil ); the fact that they are chemically stable to aging; the fact that they do not form insoluble compounds or bodies in dispersions thereof in hard water; their effectiveness both as antistatic agents and in lubricating and softening the shaped article in yarn or other form, whereby the treated yarn, film or other article is rendered more amenable to further processing or fabricating (e. g., weaving, knitting, etc., in the case of yarns); the fact that, even though they contain an antistatic inorganic salt which normally might tend to deposit large, sharp crystals having an abrasive effect upon the treated article, the composition does not physically damage or have any other deleterious effect upon the fiber, fabric or other article to which it has been applied; their compatibility with other conditioning agents commonly employed in finishing compositions used in treating fibers and other shaped articles; their ease of removal from the treated article, when such removal appears to be desirable for subsequent processing or use of the article; their non-harmful effect upon the vinyl resin or other material which is subjected to treatment; as well as other advantages.

The term "yarn" as used generically herein includes within its meaning a single filament, a plurality of filaments associated into the form of a thread and which may be of any desired twist, single or multiple threads associated or twisted together, as well as staple fibers produced from filaments or threads and spun yarn produced from such staple fibers. The term "fiber" as used generically herein includes both monofilaments and multifilaments.

In order that those skilled in the art may better understand how the present invention can be carried into effect, the following examples are given by way of illustration and not by way of limitation. All parts and percentages are by weight.

*Example 1*

A liquid antistatic composition containing about 1.5% of solids is prepared as follows:

To 587 parts of water at 120° F. is added 4 parts of an aqueous paste composed of about 25% of water and 75% of a sulfosuccinic acid bis-ester of beef tallow monoglyceride, more particularly such an ester in the form of its sodium salt. [This bis-ester is prepared as described under Example 1 of the aforementioned copending Thurston application Serial No. 338,917. The tallow used in its preparation is a beef tallow having an iodine value of 42.0, a saponification value of 198, and a solidification point of 33° C.; it contains approximately 3.2% by weight of polyunsaturated fatty acids, primarily octadecadienoic acid. The bis-ester, diluted with water to about 75% solids, is, at 80° C., a moderately viscous tan liquid which hardens to a stiff, tan paste at room temperature.] The mixture of water and the aforementioned aqueous paste is stirred until the solid is completely dispersed, after which 10.4 parts of Mg(NO₃)₂.6H₂O is added and stirring is continued until a substantially uniform dispersion has been produced.

Thirty (30) parts of dry, staple synthetic fiber (3 denier, 4½ inches average length), more particularly a fiber formed of a copolymer of about 95% acrylonitrile and 5% methyl acrylate, is immersed in this dispersion. After 10 minutes' immersion in the 120° F. dispersion, the staple is hydroextracted to contain a weight of solvent which is about equal to the weight of the dry staple. It is then dried to 2 hours at 150° F.

When the dried, treated staple is pulled through combs or stroked with metal, glass or plastic combs, there is no evidence of the accumulation of static charges of electricity on the staple. The treated staple is heated for an additional 2 hours at 200° F. When similarly tested by combing or stroke tests immediately after removal from the oven or after conditioning for 24 hours at 25° C., 50% R. H., there is still no evidence of electrostatic charges on the staple. Furthermore, even after 2 months' storage of the treated staple, there is no loss in its antistatic characteristics.

When the untreated staple is subjected to these same stroking and combing tests, it develops a high electrostatic charge and cannot be processed satisfactorily on textile equipment.

Example 2

The bis-ester employed in this example differs from that of Example 1 in that it is made from mutton tallow instead of from beef tallow. For additional details see Example 2 of the aforementioned copending application Serial No. 338,917.

A liquid antistatic composition containing about 3% solids is prepared as follows: 16 parts of an aqueous paste composed of about 25% of water and 75% of the sulfosuccinic acid bis-ester of mutton tallow monoglyceride in the form of its sodium salt is added to 574 parts of water at 120° F., and the mixture is stirred until a substantially uniform dispersion has been obtained. Ten and four-tenths (10.4) parts of $Mg(NO_3)_2 \cdot 6H_2O$ is now added, and stirring is continued until the composition is substantially uniform.

A swatch (10 parts) of fabric, square weave (40 x 46), that had been woven from staple fiber of a copolymer of acrylonitrile of the kind described more particularly in Example 1, is immersed in the 120° F. liquid antistatic composition for 1 minute, and is then passed through a pad-mangle adjusted to 100% wet-pickup. The treated fabric is dried for 5 minutes at 250° F. No static effect is observed when dried, treated fabric is hand-stroked with a glass, metal or plastic rod. In marked contrast the untreated fabric, when similarly stroked, shows considerable accumulation of electrostatic charges.

Example 3

The bis-ester employed in this example differs from that of Examples 1 and 2 in that it is a sulfosuccinic acid bis-ester of coconut oil monoglyceride, more particularly such an ester in the form of a sodium salt. [This bis-ester is prepared as described under Example 3 of the aforementioned Thurston application Serial No. 338,917. The coconut oil used in its preparation has an iodine value of 7.2, a saponification value of 259, and a solidification point of 16° C.; it contains approximately 2.9% by weight of polyunsaturated fatty acids, primarily linoleic acid. This bis-ester, after dilution with water to 75% solids content, is a tan, viscous liquid.]

A liquid antistatic composition containing about 2% solids is prepared as follows: 8 parts of the above-described aqueous bis-ester (containing 75% solids and 25% water) is added to 582 parts of water heated to 120° F. The mixture is stirred until the solid is completely dispersed, after which 10.4 parts of $$Mg(NO_3)_2 \cdot 6H_2O$$

is added and stirring is continued until a substantially uniform dispersion has been produced.

A swatch (20 parts) of fabric formed of Vinyon N (a copolymer of about 60% vinyl chloride and about 40% acrylonitrile) is immersed in the 120° F. liquid antistatic composition for 1 minute, and is then passed through a pad-mangle adjusted to 100% wet-pickup. The treated fabric is dried at 110° F. for 1 hour. No static effect occurs when the dried, treated fabric is hand-stroked with a glass, metal or plastic rod. In marked contrast the untreated fabric accumulates static charges of electricity when similarly stroked or by merely waving it in the air.

Example 4

Example 3 is repeated, but substituting a swatch of nylon fabric for the swatch of Vinyon N fabric. The dried, treated nylon fabric accumulates no observable charge of static electricity when hand-stroked as described in Example 3, whereas the untreated fabric accumulates electrostatic charges upon hand-stroking with a glass, metal or plastic rod.

Example 5

This example illustrates the treatment of Dacron fibers. Dacron is a trade name for fibers formed of polymeric ethylene glycol terephthalate. It is a polyester condensation polymer.

Thirty (30) parts of dry Dacron staple (3 denier, 2½ inches in average length) is immersed in a liquid antistatic composition containing 2% of solids and which is prepared as follows:

To 586 parts of water at 120° F. is added 4 parts of the same bis-ester described in Example 2, and the mixture is stirred until a substantially uniform dispersion has been obtained. Thereafter, 10.4 parts of $$Mg(NO_3)_2 \cdot 6H_2O$$

is added and stirring is continued until the composition is substantially uniform.

After ten minutes' immersion in the aforementioned dispersion at 120° F., the staple is hydroextracted to contain a weight of solvent which is approximately equal to the weight of the undried staple. The treated staple is then dried for 2 hours at 150° F. When the dried, treated staple is stroked with metal, glass or plastic combs there is no evidence of the accumulation of static charges of electricity. In marked contrast, the untreated Dacron staple fibers, when similarly combed, balloon, flow apart and adhere to the comb.

Example 6

Example 5 is repeated, but instead of using Dacron staple fibers there is used 30 parts of Orlon staple which is formed of a homopolymer of acrylonitrile. Substantially the same results are obtained.

Example 7

Ten (10) parts of woolen flannel are impregnated by immersion in the same liquid antistatic composition described in Example 5, after which the flannel is passed through squeeze rolls so adjusted as to give 100% wet-pickup. After drying the wet, impregnated flannel for ten minutes at 250° F., it is rubbed with a plastic rod. After rubbing, the flannel shows no evidence of accumulating electrostatic charges when tested by bringing carbon black particles in close proximity thereto. The untreated woolen flannel, on the other hand, shows the accumulation of charges of static electricity when similarly stroked and tested.

Example 8

Example 7 is repeated but using (1) medium weight rayon suiting and (2) an acetate rayon fabric as the materials to which the antistatic composition is applied instead of woolen flannel. The results are substantially the same as those described in Example 7.

When a solution of magnesium nitrate alone is applied to an acetate rayon fabric, it stiffens the fabric considerably.

Example 9

A liquid antistatic composition containing about 1.5% solids is prepared as follows:

To 589 parts of water at 120° F. is added 8 parts of aqueous sulfosuccinic acid bis-ester (about 25% water and about 75% bis-ester) of olive oil monoglyceride, which is prepared as described under Example 4 of the aforementioned Thurston copending application Serial No. 338,917, and is in the form of its sodium salt. The mixture is stirred until a substantially uniform dispersion has been obtained, after which 3 parts of strontium chloride is added and stirring is continued until the composition is substantially uniform.

Thirty (30) parts of dry staple fiber (3 denier, 1½ inches in average length) formed of a copolymer of about 95% acrylonitrile and 5% methyl acrylate is immersed for 10 minutes in the 120° F. liquid antistatic composition. The wet, treated staple is squeezed by hand to a 200% wet-pickup, after which it is dried for 4 hours at 150° F. Static control as measured by combing or stroking tests, such as have been described hereinbefore, or by tumbling, is excellent. In marked contrast, the untreated staple rapidly accumulates and retains electrostatic charges when similarly tested. Similar results are obtained when 3 parts of one of the following salts is substituted for 3 parts of strontium chloride in the above antistatic composition:

Aluminum chloride
Magnesium chloride
Strontium nitrate
Zinc chloride
Calcium chloride
Lithium fluoride
Sodium nitrate These and other inorganic antistatic salts, including strontium chloride, or mixtures thereof, also may be used instead of magnesium nitrate in any of Examples 1 to 8, inclusive.

Example 10

Liquid antistatic compositions each containing about 1.5% solids are prepared in exactly the same manner described in Example 9 with the exception that, instead of using 3 parts of strontium chloride, there is used in the individual composition 3 parts of calcium nitrate, lithium nitrate, aluminum nitrate, sodium nitrite and sodium chloride.

A swatch (10 parts) of fabric formed of cellulose acetate rayon is immersed in each dispersion of the antistatic composition at 120° F. for 1 minute, and is then passed through a pad-mangle adjusted to 100% wet-pickup. The impregnated fabrics are dried for 5 minutes at 250° F. No static effect occurs when the dried, treated fabrics are stroked with a glass, metal or plastic rod. In marked contrast the untreated fabrics accumulate static charges of electricity when similarly stroked.

Example 11

This example illustrates the use of the antistatic compositions herein involved in the final rinse in dry-cleaning operations.

A swatch (10 parts) of fabric, square weave (40 x 46), that had been woven from staple fibers of a copolymer of acrylonitrile of the kind described more particularly in Example 1, is immersed in a solvent solution which is prepared as follows:

About 5 parts of the sodium salt of the sulfosuccinic acid bis-ester of beef tallow monoglyceride, such as that employed in Example 1, and 4 parts of $Mg(NO_3)_2 \cdot 6H_2O$ are dissolved in 50 parts of isopropanol. To the resulting solution is added 42 parts of perchloroethylene. The fabric is immersed in the solvent mix for 5 minutes and is then passed through squeeze rolls to remove the excess solvent. The treated fabric is then dried in a steam-heated oven at 140° F. for 4 hours. The dried fabric is free from static when subjected to stroking and combing tests of the kind described in the previous examples. On the other hand, the untreated fabric accumulates electrostatic charges when similarly tested.

Example 12

Example 11 is repeated but using rayon challis, wool and viscose suiting as the fabrics which are subjected to the described treatment. In each case the dried, treated fabrics show no accumulation of static charges of electricity when tested by means of the aforedescribed stroking and combing tests.

Example 13

A sample of polyacrylonitrile (homopolymeric acrylonitrile) having an average molecular weight of about 80,000 is dissolved in a 53% aqueous, neutral solution of calcium thiocyanate at about 45° C. under an atmosphere of carbon dioxide in the proportion of about 7 parts of polymer to about 93 parts of calcium thiocyanate solution. The solution of polyacrylonitrile is spun into a fiber by extruding it at about 70°–80° C. through a 40-hole spinneret having hole diameters of 110 microns into a spinning bath comprising water at about 1° C. The coagulated fiber is carried back and forth through the bath by means of a power-driven, submerged godet placed at one end of the bath and a set of free-running rollers at the other end. The total bath travel of the fiber is about 144 inches. On leaving the bath the yarn is subjected, during its travel, to a stretch of about 650% in a hot water bath maintained at 98°–99° C., and is finally collected on a bobbin rotating in a water spray to keep the yarn in gel state. A spool of the yarn in gel state is suspended in a liquid antistatic composition which is the same as that described in Example 2 with the exception that it has been further diluted with water to 1.5% solids content. This composition is maintained at 40°–50° C. during the treatment. The treated yarn is continuously passed over heated, converging drying rolls as is more fully described in, for instance, Cresswell et al., Patent No. 2,558,733. The dried yarn is immediately twisted and collected on a bobbin. The amount of "finish" on the treated yarn is found to be about 1% by weight of the dried, untreated yarn.

Yarn which has been treated in gel state with the above-described liquid antistatic composition is found to run cleaner on the drying rolls than the same gel yarn which has not been treated with an antistatic agent. Furthermore, the dried yarn is easier to handle, since the treatment eliminates filament ballooning caused by the building up of electrostatic charges on the filaments during processing.

Example 14

A liquid antistatic composition is prepared as follows:
To 588 parts of water at 120° F. is added 6 parts of the sodium salt of the sulfosuccinic acid bis-ester of beef tallow monoglyceride (see Example 1), and which also may be designated as sodium bis(stearoyl monoglyceryl)-sulfosuccinate. The mixture is stirred until a substantially uniform dispersion is obtained. After cooling to 80° F., 5.2 parts of $Mg(NO_3)_2 \cdot 6H_2O$ is added, and stirring is continued until the composition is substantially uniform.

Thirty (30) parts of dry staple fiber (3 denier, 1½ inches in average length) formed of a copolymer of about 95% acrylonitrile and 5% methyl acrylate is immersed for 10 minutes in the 120° F. liquid antistatic composition. The wet, treated staple is squeezed by hand to a 200% wet-pickup, after which it is dried for 4 hours at 150° F. Static control as measured by combing or stroking tests, such as have been described hereinbefore, or by tumbling, is excellent. In marked contrast, the untreated staple rapidly accumulates and retains electrostatic charges when similarly tested.

Example 15

A swatch (10 parts) of fabric formed of cellulose acetate rayon is immersed for 1 minute in a 120° F. liquid antistatic composition prepared as described in Example 14, and is then passed through a pad-mangle adjusted to 100% wet-pickup. The impregnated fabric is dried for 5 minutes at 250° F. No static effect occurs when the dried, treated fabric is stroked with a glass, metal or plastic rod. In marked contrast the untreated fabric accumulates static charges of electricity when similarly stroked.

Example 16

Same as in Example 15 with the exception that a swatch (20 parts) of fabric formed of Vinyon N is immersed in the 120° F. liquid antistatic composition for 1 minute and the treated fabric, after having been passed through a pad-mangle adjusted to 100% wet-pickup, is dried for 1 hour at 110° F. No static effect occurs when the dried, treated fabric is hand-stroked with a glass, metal or plastic rod. In marked contrast the untreated fabric accumulates static charges of electricity when similarly stroked or by merely waving it in the air.

Example 17

The liquid antistatic composition of this end of the two examples that follow is prepared in exactly the same manner as described under Example 14 with the exception that there are used 590 parts of water, 4 parts of the bis-ester and 6 parts of sodium nitrate.

This antistatic composition is applied to dry staple fiber of the kind described in Example 14 and in the manner there set forth. Substantially the same results are obtained.

Example 18

Same as in Example 17 with the exception that the antistatic composition is applied to a cellulose acetate rayon fabric of the kind and in the manner described in Example 15. Substantially the same results are obtained.

Example 19

Ten (10) parts of woolen flannel are impregnated by immersion in the same liquid antistatic composition described in Example 17, after which the flannel is passed through squeeze rolls so adjusted as to give 100% wet-pickup. After drying the wet, impregnated flannel for ten minutes at 250° F., it is rubbed with a plastic rod. After rubbing, the flannel shows no evidence of accumulating electrostatic charges when tested by bringing carbon black particles in close proximity thereto. The untreated woolen flannel, on the other hand, shows the accumulation of charges of static electricity when similarly stroked and tested.

The preferred inorganic salts used in producing the antistatic compositions herein involved are those water-soluble inorganic salts, the polarizability of the cation of which is not more than $12 \times 10^{-25}$ cc. Examples of such salts are:

Magnesium nitrate
Magnesium chloride
Magnesium chromate (used under acid conditions, e. g., a pH of about 4.0)
Magnesium acid phosphate (used under acid conditions, e. g., a pH of about 4.0)
Strontium nitrate
Strontium chloride
Aluminum nitrate
Aluminum chloride
Calcium nitrate
Zinc chloride
Calcium chloride
Sodium chloride
Sodium nitrite
Sodium nitrate
Lithium nitrate
Lithium fluoride In connection with the polarizability of the cation of the preferred salts mentioned above, attention is directed to the following definition of polarizability of an ion and brief discussion of the same:

The polarizability of an ion properly may be described as its ability to adjust its electron distribution to the electrical forcefields of its environment; or, it also may be defined as a measure of the deformability of the electron cloud of an ion induced by an electromagnetic forcefield. A surface has a symmetrical forcefield. When a highly polarizable cation is adsorbed on a surface, the electron distribution of the cation becomes asymmetrical. For instance, the electron distribution of a lead cation adsorbed on soft glass is so changed that electrons are repelled from the surface. This makes the ultimate surface resemble that of metallic lead. The surface is hydrophobic. Ions of low polarizability are not sensitive to the asymmetrical forcefield, do not develop an asymmetrical electron distribution and, therefore, do not inhibit the surface forces from attracting water molecules. The polarizabilities of some of the component ions of salts can be found in Landolt-Börnstein, 6th ed., vol. I part 1, page 401, published in 1950 by Springer-Verlag (Berlin). Other polarizabilities not given in this publication can be estimated from the atomic refractions which are given in this publication. It will be clear from the data and other information given in this publication, and from the foregoing brief discussion, as to the meaning of the expression appearing herein that limits the antistatic inorganic salt ingredient of the composition to those wherein the polarizability of the cation component thereof is not more than $12 \times 10^{-25}$ cc.

The inorganic salts used in producing the antistatic compositions herein involved are those soluble inorganic salts which function as antistatic agents for the base material which is treated with the antistatic composition and which normally are deposited in the form of relatively large crystals (e. g., from 10 to 15 microns, and larger, in average particle size) upon volatilization of the solvent in which the particular salt is dissolved, e. g., water. The bis-esters employed in producing the antistatic compositions herein involved are capable of either preventing the deposition of such crystals completely or of controlling or modifying the crystal deposition or formation so that perceptible crystals having a maximum average particle size of about 5 microns are present in the composition. As has been indicated hereinbefore, particles of this size are near the lower limit of the resolving power of light microscopes.

It will be understood, of course, by those skilled in the art that my invention is not limited to the use of the specific antistatic compositions described in the above illustrative examples or in the particular manner and to the particular base materials described by way of illustration in these examples, since other compositions of the kind set forth in the portion of this specification prior to and after the examples can be employed in treating textile and other materials or articles which, in a dry state, normally accumulate or tend to accumulate static charges of electricity. Thus, instead of the particular bis-ester employed in the individual examples, I may use any other such product of the kind described herein and more fully in the aforementioned Thurston copending application Serial No. 338,917. Likewise, antistatic inorganic salts other than those employed in the various examples and mentioned elsewhere herein can be used in the antistatic compositions employed in practicing the present invention.

The antistatic compositions herein involved are effective not only in improving the useful properties of textile fibers and fabrics which, in a dry state, normally accumulate (or tend to accumulate) static charges of electricity, but also various other shaped or formed articles, e. g., phonograph records made of vinyl resins, vinyl and other plastic materials in sheet or film form, photographic-film base materials formed of cellulose ester or other material that tends to accumulate an electrostatic charge, etc.

I claim:

1. An antistatic composition comprising (1) an antistatic agent which is a water-soluble inorganic salt that normally is deposited in the form of relatively large crystals upon volatilization of the solvent in which it is dissolved and (2) a bis-ester of sulfosuccinic acid with a substantially bi-molecular quantity of a higher fatty acid glyceride derived from a member of the group consisting of animal and vegetable oils and fats containing less than 15% by weight of polyunsaturated fatty acids, said glyceride being constituted of not less than 50 mole percent of monoglyceride and up to 50 mole percent of diglyceride, and the ingredients of (1) and (2) being present in the said antistatic composition in weight percentages of from about 5% to about 97% of the former to from about 95% to about 3% of the latter.

2. An antistatic composition as in claim 1 wherein the bis-ester of (2) is a bis-ester of sulfosuccinic acid with a substantially bi-molecular quantity of a tallow fatty acid glyceride which is constituted of not less than 50 mole percent of monoglyceride and up to 50 mole percent of diglyceride.

3. An antistatic composition as in claim 1 wherein the bis-ester of (2) is a bis-ester of sulfosuccinic acid with a substantially bi-molecular quantity of a stearic acid monoglyceride.

4. An antistatic composition as in claim 1 wherein the antistatic agent of (1) is a water-soluble inorganic salt that normally is deposited in the form of relatively large crystals upon volatilization of the solvent in which it is dissolved, the polarizability of the cation of said salt being not more than $12 \times 10^{-25}$ cc., and the bis-ester of (2) is one wherein the higher fatty acid glyceride comprises a mixture of from about 50% to about 95% monoglyceride and from about 50% to about 5% diglyceride, said percentages being on a molar basis.

5. An antistatic composition as in claim 1 wherein the antistatic agent of (1) is a water-soluble inorganic salt that normally is deposited in the form of relatively large crystals upon volatilization of the solvent in which it is dissolved, the polarizability of the cation of said salt being not more than $12 \times 10^{-25}$ cc., and the bis-ester of (2) is a sulfosuccinic bis-ester represented by the general formula

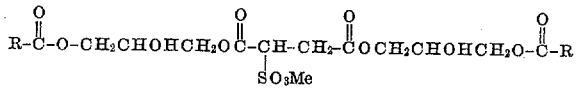

wherein R is a higher fatty acid radical derivable from a member of the group consisting of animal and vegetable oils and fats containing less than 15% by weight of polyunsaturated fatty acids and Me is a salt-forming cation of the group consisting of alkali metals and ammonium.

6. An antistatic composition as in claim 1 wherein the antistatic agent of (1) is a water-soluble inorganic salt that normally is deposited in the form of relatively large crystals upon volatilization of the solvent in which it is dissolved, the polarizability of the cation of said salt being not more than $12 \times 10^{-25}$ cc., and the bis-ester of (2) is a sulfosuccinic bis-ester represented by the general formula

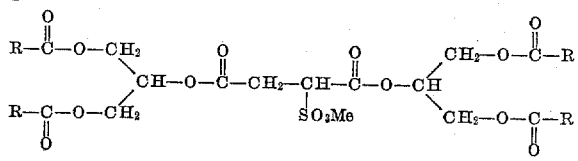

wherein R is a higher fatty acid radical derivable from a member of the group consisting of animal and vegetable oils and fats containing less than 15% by weight of polyunsaturated fatty acids and Me is a salt-forming cation of the group consisting of alkali metals and ammonium.

7. A liquid antistatic composition comprising an aqueous dispersion of the ingredients defined in (1) and (2) of claim 1 and in the weight percentages, with respect to each other, that are there set forth.

8. A paste-like material which is dilutable with water to form a substantially homogeneous, liquid, antistatic composition and which comprises the ingredients defined in (1) and (2) of claim 1 and in the weight percentages, with respect to each other, that are there set forth, the aforementioned ingredients and water being present in the said paste-like material in weight percentages of from about 20% to about 65% of the former to from about 80% to about 35% of the latter.

9. The method of conditioning an organic material which, in a dry state, normally tends to accumulate static charges of electricity thereon, said method comprising applying to said material a liquid antistatic composition comprising (1) an antistatic agent which is a water-soluble inorganic salt that normally is deposited in the form of relatively large crystals upon volatilization of the solvent in which it is dissolved and (2) a bis-ester of sulfosuccinic acid with a substantially bi-molecular quantity of a higher fatty acid glyceride derived from a member of the group consisting of animal and vegetable oils and fats containing less than 15% by weight of polyunsaturated fatty acids, said glyceride being constituted of not less than 50 mole percent of monoglyceride and up to 50 mole percent of diglyceride, and the ingredients of (1) and (2) being dispersed in a volatile liquid and being present in the said antistatic composition in weight percentages of from about 5% to about 97% of the former to from about 95% to about 3% of the latter; and drying the thusly treated material to volatilize the said liquid, the amount of the said liquid antistatic composition which is applied to the said material being such that the total amount of the ingredients of (1) and (2) held by the treated material is from about 0.2% to about 10% of the weight of the dried, untreated material.

10. A method as in claim 9 wherein the antistatic agent of (1) is a water-soluble inorganic salt that normally is deposited in the form of relatively large crystals upon volatilization of the solvent in which it is dissolved, the polarizability of the cation of said salt being not more than $12 \times 10^{-25}$ cc.

11. A method as in claim 9 wherein the organic material to which the defined antistatic composition is applied is a shaped article comprising a vinyl resin.

12. A method as in claim 11 wherein the shaped article includes fibers formed of a thermoplastic vinyl resin comprising a polymer of acrylonitrile.

13. The method which comprises applying a liquid treating composition to a fiber in gel state and in which the solid phase comprises an acrylonitrile polymerization product containing in the molecules thereof an average of at least about 80% by weight of combined acrylonitrile, said treating composition comprising an aqueous dispersion containing (1) an antistatic agent which is a water-soluble inorganic salt that normally is deposited in the form of relatively large crystals upon volatilization of the solvent in which it is dissolved, the polarizability of the cation of said salt being not more than $12 \times 10^{-25}$ cc., and (2) a crystal growth-inhibiting agent which is the bis-ester of sulfosuccinic acid that is defined in (2) of claim 1, the antistatic agent of (1) and the crystal growth-inhibiting agent of (2) being present in the said aqueous dispersion in weight percentages of from about 5% to about 97% of the former to from about 95% to about 3% of the latter, and being so proportioned with respect to each other that the crystal growth-inhibiting agent will inhibit the deposition of the aforesaid crystals; and drying the thusly treated, gelled fiber, the said treating composition imparting antistatic characteristics to the said fiber during and after drying thereof, and the amount of the said composition which is applied to the said gelled fiber being such that the total amount of the ingredients of (1) and (2) held by the treated fiber is from about 0.2% to about 10% of the weight of the dried, untreated fiber.

14. An organic article which, in a dry state, normally has a tendency to accumulate static charges of electricity thereon, said article having deposited at least on outer surfaces thereof an antistatic composition comprising (1) an antistatic agent which is a water-soluble inorganic salt that normally is deposited in the form of relatively large crystals upon volatilization of the solvent in which it is dissolved and (2) a bis-ester of sulfosuccinic acid with a substantially bi-molecular quantity of a higher fatty acid glyceride derived from a member of the group consisting of animal and vegetable oils and fats containing less than 15% by weight of polyunsaturated fatty acids, said glyceride being constituted of not less than 50 mole percent of monoglyceride and up to 50 mole percent of diglyceride, and the ingredients of (1) and (2) being present in the said antistatic composition in weight percentages of from about 5% to about 97% of the former to from about 95% to about 3% of the latter, and the total amount of the ingredients of (1) and (2) that is held by the treated article being from about 0.2% to about 10% of the weight of the dried, untreated article.

15. A textile formed of fibers including fibers of a thermoplastic product of polymerization of polymerizable vinyl compound including acrylonitrile, said textile in a dry state normally having a tendency to accumulate static charges of electricity thereon and, to lessen this tendency, having been treated with an antistatic composition comprising (1) an antistatic agent which is a water-soluble inorganic salt that normally is deposited in the form of relatively large crystals upon volatilization of the solvent in which it is dissolved and (2) a bis-ester of sulfosuccinic acid with a substantially bi-molecular quantity of a higher fatty acid glyceride derived from a member of the group consisting of animal and vegetable oils and fats containing less than 15% by weight of polyunsaturated fatty acids, said glyceride being constituted of not less than 50 mole percent of monoglyceride and up to 50 mole percent of diglyceride, and the ingredients of (1) and (2) being present in the said antistatic composition in weight percentages of from about 5% to about 97% of the former to from about 95% to about 3% of the latter, and the total amount of the ingredients of (1) and (2) that is held by the treated textile being from about 0.2% to about 10% of the weight of the dried, untreated textile.

References Cited in the file of this patent

UNITED STATES PATENTS

| | | |
|---|---|---|
| 2,086,544 | Dreyfus | July 13, 1937 |
| 2,086,590 | Whitehead | July 30, 1937 |
| 2,184,794 | De Groote | Dec. 26, 1939 |
| 2,543,539 | Wizon | Feb. 27, 1951 |
| 2,628,176 | Simon et al. | Feb. 10, 1953 |
| 2,717,877 | Vitalis | Sept. 13, 1955 |
| 2,734,833 | Thurston | Feb. 14, 1956 |

UNITED STATES PATENT OFFICE

CERTIFICATE OF CORRECTION

Patent No. 2,798,044                                        July 2, 1957

Emil Alfred Vitalis

It is hereby certified that error appears in the printed specification of the above numbered patent requiring correction and that the said Letters Patent should read as corrected below.

Column 3, line 36, for "thay" read -- they --; line 49, after "with" insert -- the --; column 4, line 71, for "carbon chain" read -- carbon-chain --; column 5, line 2, for "thees" read -- these --; same line, for "consitituents" read -- constituents --; line 4, for "5% is" read -- 5% of --; line 63, for "sale" read -- salt --; column 7, line 6, after "involved" insert -- herein --; column 10, line 40, for "stagle" read -- staple --; column 11, line 2, for "to" read -- for --; column 14, line 59, for "sulfocuccinate" read -- sulfosuccinate --; column 15, line 27, for "end" read -- and --.

Signed and sealed this 24th day of September 1957.

(SEAL)

Attest:

KARL H. AXLINE
Attesting Officer

ROBERT C. WATSON
Commissioner of Patents